No. 791,357. PATENTED MAY 30, 1905.
J. A. & A. F. MUSTEE.
INSTANTANEOUS WATER HEATER.
APPLICATION FILED JUNE 27, 1902. RENEWED SEPT. 29, 1904.
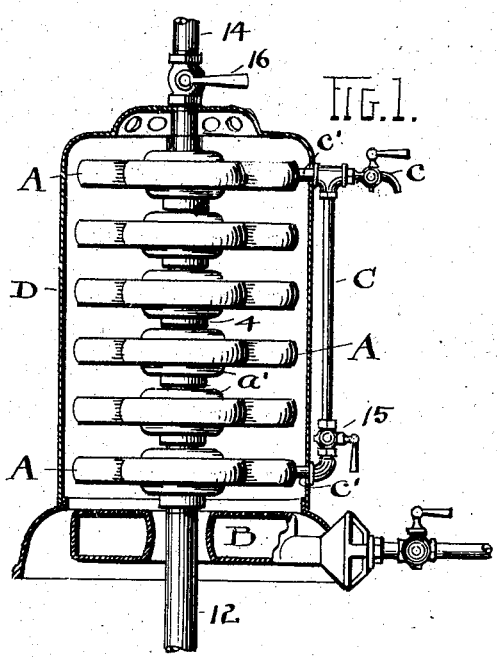
FIG. 1.
FIG. 2.
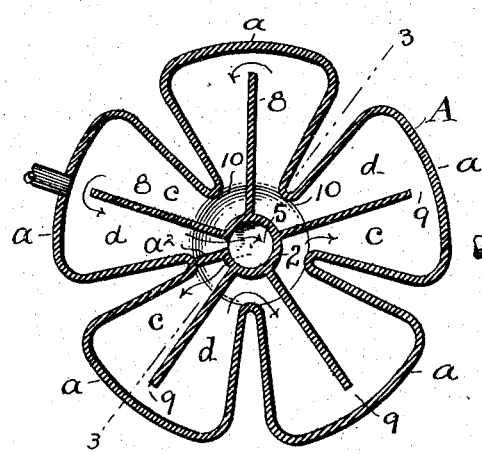
FIG. 3.
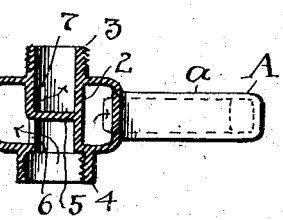
ATTEST
W. B. Moser
F. M. Madden
INVENTORS.
Joseph A. Mustee
Ali A. F. Mustee
BY W. F. Fisher ATTY No. 791,357.  
Patented May 30, 1905.

UNITED STATES PATENT OFFICE.

JOSEPH A. MUSTEE AND ALBERT F. MUSTEE, OF CLEVELAND, OHIO.

INSTANTANEOUS WATER-HEATER.

SPECIFICATION forming part of Letters Patent No. 791,357, dated May 30, 1905.

Application filed June 27, 1902. Renewed September 29, 1904. Serial No. 226,490.

*To all whom it may concern:*

Be it known that we, JOSEPH A. MUSTEE and ALBERT F. MUSTEE, citizens of the United States, residing at Cleveland, Cuyahoga county, and State of Ohio, have invented certain new and useful Improvements in Instantaneous Water-Heaters; and we do declare that the following is a full, clear, and exact description of the invention, which will enable others skilled in the art to which it appertains to make and use the same.

Our invention relates to instantaneous water-heaters; and the invention consists in the construction, combination, and arrangement of parts, substantially as shown and described, and particularly pointed out in the claims.

In the accompanying drawings, Figure 1 is a side elevation of the heater with the shell or casing sectioned away. Fig. 2 is a sectional plan view of one of the heater-sections, and Fig. 3 is a vertical cross-section of one of the heater-sections.

The heater thus shown is of the class adapted to heat water instantaneously or practically as soon as the heat has been applied, so that heated water may be drawn quickly instead of waiting for a time and continuously while the heat is on. To this end the heater is constructed with a series of sections or subdivided chambers A of five-foil or five-leaf formation in plan and connected up at their center in a column, as seen in Fig. 1. Each "leaf" $a$, so called, is spaced apart from the other well in toward the center of the section, so as to afford circulating-space for the heat between the leaves and from section to section, it being understood that to get the best effect in this particular it is desirable to stagger the sections in the column. Each section is further peculiar in this that in addition to its leaf formation there is a central vertical tubular portion 2 extending through the section from top to bottom and in this instance provided with threaded extremities 3 and 4, respectively, for making connection with the adjacent sections above and below. This central tubular or hub portion has a cut-off or diaphragm 5 across its center and a water-inlet port 6 on one side thereof to one of the leaves $a$ and an outlet-port 7 on the other side of said diaphragm and from the leaf next and last before the leaf having the inlet-port. Then as a further feature there is a vertical web 8, which projects centrally out into each leaf from tubular hub 2 nearly to the outer wall of said leaf, but short enough to allow a free flow of water around the end of the web through passage 9 from the outward-flowing subdivision $c$ of the leaf to the inward-flowing subdivision $d$ thereof. The web 8 is cast integral with the body of section A along all its edges and spans its leaf from side to side as well as being integral with hub 2. It follows from this construction that all the water must traverse every leaf of every section forward and return before it can make its exit to the next higher or lower one, and the water flows from one leaf to another in a section around the point 10, to which the walls of the leaves converge and where they meet apart from hub 2 a sufficient distance to afford a fluid-passage from one leaf to another. Then as the water returns through the last leaf and subdivision $d$ thereof it flows out through exhaust-opening 7 over diaphragm 5 and thence up into the next section, where the same circuitous route is taken, and so on.

In the foregoing paragraph it is assumed that the water is traveling upward in the heater from inlet 12 below to outlet 14 at the top; but in some cases a reverse circulation is established, and the water flows downward instead within limits, as will now be seen. Thus in Fig. 1 we show an outside water-column C, tapped at its ends into the lower and upper sections, respectively, and a faucet $c$ is shown at the top of said column or pipe, but it might be below as well. We also provide a cut-off valve 15 in this column, so as to close it at pleasure. When this column is open, we are enabled to establish an easier line of communication with the top section A than through the resistance within the heater, and so it follows that the heated water in the lower section next to burner B may be taken off by column C directly to the upper section and out through pipe 14 for use or be drawn off by faucet $c$, while the cooler water in the next higher sections will tend to gravitate downward and mingle with the supply from the source 12. Of course lower section A becomes heated first and hottest, as it is directly over the burner, and it is an advantage of very great value in this heater that the water may be drawn directly from this lower section when urgently wanted rather than to wait until all the heater and water are brought up to an equally-high temperature.

A suitable shell or casing D incloses the heater-sections and confines the products of combustion about the sides thereof, but has a suitable outlet at the top, and we may use any available kind of burner, according to the kind of fuel; but usually the limitations are manufactured or natural gas or hydrocarbon oil, gasolene, or kerosene. So, also, any available water-supply may be used from a city main to a local gravity-feed.

A valve 16 controls the flow of water out through pipe 14, and this may be more or less closed, especially if it be desired to confine the water within the heater with circulation up through column C.

Obviously the heater-sections may be of larger or smaller size and as many may be used as are found available; but more than five or six are not desirable, because the heat products of combustion become absorbed within the limits shown.

The sections A are enlarged somewhat in depth about their central portion, as seen at $a'$, which gives room for the flow of the fluid in and about the ducts 6 and 7 and at the point where the fluid passes from one leaf or wing into another. This also enables us to make the said leaves in themselves comparatively shallow, so as to get the best possible exposure to the heat for quick results.

The webs or walls 8 are radially disposed, as shown, with hub 2 as their center, and they cut the internal water-space arbitrarily into a long circuit for the water to travel as it enters opening 6 and passes out through opening 7, and the turning-points 9 and 10 in the water-circuit alternate.

Short pipes $c'$ connect the ends of pipe C with sections A. A web $a^2$ closes the water-space between the first and the last leaf in each heater-section.

What we claim is—

1. In water-heaters, a heater-section constructed with a series of substantially leaf-shaped portions having a common center and intermediate vertical webs to cause water to travel back and forth through each portion and from one to another in each section, substantially as described.

2. In water-heaters, a heater-section having a substantially circular outline and divided up into a series of leaves spaced apart at their edges and united at a common center, and said leaves provided each with an intermediate vertical web to cause the water to circulate from one leaf to another, and separate inlets and outlets to each series of leaves at its center, substantially as described.

3. A heater-section formed with a series of hollow leaves spaced apart externally at their edges toward the center of the section, and the said section having a hub at its center extending from top to bottom of the section, with a division-wall and a central diaphragm therein, an inlet for water on one side of said diaphragm and an outlet for water on the other side thereof, and a wall in said section separating the said inlet and outlet, substantially as described.

4. A section for a water-heating device having a substantially tubular hub constructed to be connected up with another section of the heater and provided with a diaphragm substantially midway its length and a water-inlet on one side of said diaphragm and an outlet on the other side, and said section comprising a series of substantially leaf-shaped subdivisions provided with an intermediate vertical web to cause water to traverse the entire series of subdivisions from the said inlet to the said outlet of the section in reverse directions, substantially as described.

5. The heater-section, substantially as described, having a tubular hub with threaded extremities and a diaphragm across its center and inlet and outlet openings on opposite sides of said diaphragm, and the said section having substantially leaf-shaped portions with their walls converging toward the center thereof and each portion provided with a vertical web subdividing the same part way radially, thereby causing the water to flow around the end of said web back and forth in each leaf portion, substantially as described.

6. In a water-heater, a series of sections arranged one above the other and connected at their centers and each section having a tubular hub constructed at its ends to make a close joint with the next adjacent section, the said hub having a closed central diaphragm and inlet and outlet openings, respectively, upon opposite sides thereof, and a series of vertical radial walls projecting from said hub centrally into said section, whereby the water is caused to traverse the entire inner portion of said section from the said inlet-opening to the outlet-opening, substantially as described.

Witness our hands to the foregoing specification this 14th day of June, 1902.

JOSEPH A. MUSTEE.
ALBERT F. MUSTEE.

Witnesses:
R. B. MOSER,
T. M. MADDEN.